United States Patent [19]

Togawa et al.

[11] Patent Number: 4,908,864
[45] Date of Patent: Mar. 13, 1990

[54] VOICE RECOGNITION METHOD AND APPARATUS BY UPDATING REFERENCE PATTERNS

[75] Inventors: Fumio Togawa; Mitsuhiro Hakaridani; Hiroyuki Iwahashi; Toru Ueda, all of Nara, Japan

[73] Assignee: Sharp Kabushiki Kaisha, Osaka, Japan

[21] Appl. No.: 34,060

[22] Filed: Apr. 2, 1987

[30] Foreign Application Priority Data

Apr. 5, 1986 [JP] Japan .................................. 61-78821
Apr. 5, 1986 [JP] Japan .................................. 61-78822
Apr. 5, 1986 [JP] Japan .................................. 61-78823

[51] Int. Cl.⁴ .............................................. G10L 5/06
[52] U.S. Cl. ................................................. 381/43
[58] Field of Search ................................. 381/41–46; 369/513.5; 382/14–15

[56] References Cited

U.S. PATENT DOCUMENTS

| 4,509,133 | 4/1985 | Monbaron et al. | 381/43 |
| 4,618,984 | 10/1986 | Das et al. | 381/43 |
| 4,651,289 | 3/1987 | Maeda et al. | 381/43 |
| 4,720,802 | 1/1988 | Damoulakis et al. | 381/43 |
| 4,723,290 | 2/1988 | Watanabe et al. | 381/43 |
| 4,783,803 | 11/1988 | Baker et al. | 381/43 |

FOREIGN PATENT DOCUMENTS 0109140 5/1984 European Pat. Off. .
56-2039 1/1981 Japan .
58-55995 1/1983 Japan .

*Primary Examiner*—Gary V. Harkcom
*Assistant Examiner*—John A. Merecki
*Attorney, Agent, or Firm*—Flehr, Hohbach, Test, Albritton & Herbert

[57] ABSTRACT

Inputted voice signals are analyzed in units of syllables. Each syllable is compared with standard syllables preregistered in a memory and thereby recognized but corrections may be made on erroneous recognitions by referencing a dictionary or entering a command. Each standard pattern is associated with phonological information on the neighborhood in a voice signal from where it was extracted and may be updated by another pattern having the same phonological information. Temporal sequences of correct and erroneous recognitions of individual syllables as well as whole syllables are stored and referenced in determining whether a standard pattern should be updated. A maximum pattern number may be set for each syllable.

6 Claims, 4 Drawing Sheets

FIG.—1

VOICE RECOGNITION METHOD AND APPARATUS BY UPDATING REFERENCE PATTERNS

BACKGROUND OF THE INVENTION

This invention relates to a voice recognition system applicable, for example, to a Japanese language voice input device adapted to recognize input voice signals in units of syllables.

Voice signals can be recognized relatively accurately if each sound is pronounced separately. In the case of a continuous voice signal, syllables are strongly influenced by their neighbors and vary greatly both in strength and pitch, depending on the position in a word, a phrase or a sentence. As a result, it is difficult to accurately analyze continuously delivered voice signals because the characteristic pattern of each syllable varies significantly, depending on the context and other factors.

In view of this problem caused by the phonological variations of syllables, attempts have been made, with voice recognition systems applicable, for example, to a Japanese language voice input device, not only to provide each syllable with a plurality of standard characteristic patterns but also to replace patterns with inferior recognition records with new patterns.

With such a system, average accuracy of recognition can be improved because standard characteristic patterns which are registered depend strongly on the frequency at which the corresponding syllable appears. In a phrase or a sentence which seldom appears, however, accuracy usually drops with such a system. This is because the number of standard patterns for each syllable is not specified and as the system keeps "learning" according to the frequency at which each pattern appears, the numbers of individual patterns for each syllable become unevenly distributed.

Another disadvantage of prior art voice recognition systems has been that they could not handle the situation where characteristic patterns belonging to the same category cease to match due to a change in voice signal waveform caused by a change in the speaker's sound quality or in the sound pickup system.

SUMMARY OF THE INVENTION

It is therefore an object of the present invention to provide a voice recognition system capable of effectively updating even those standard characteristic patterns for syllables which are seldom received, thereby improving the accuracy of syllable recognition.

It is another object of the present invention to provide a voice recognition system with improved accuracy by reducing variations in recognition ratio as much as possible by preventing uneven distribution of patterns according to the frequency at which syllables are received.

It is still another object of the present invention to provide a voice recognition system capable of maintaining a high level of recognition accuracy even when characteristic patterns belonging to the same category fail to match.

This invention relates to a voice recognition system which recognizes an input voice signal in units of syllables by calculating the degrees of similarity with standard characteristic patterns of a plurality of syllables which are preliminarily registered and making corrections on the results of such calculation by comparison with a dictionary or by external operation from a keyboard.

According to one aspect of the present invention, phonological environment of each standard pattern is taken into consideration and only those of the standard patterns appearing in the same environmental conditions as the syllable being analyzed are considered. According to another aspect of the present invention, records are kept on how syllables have been correctly or erroneously recognized and such historical data are referenced in determining whether or not standard patterns which erroneously recognized a syllable should be updated. According to still another aspect of the present invention, a maximum number of standard patterns is set for each syllable and minimum numbers of patterns are initially used for syllable recognition. In this manner, uneven distributions of standard patterns among the corresponding syllables can be avoided and reliable recognition can be achieved.

BRIEF DESCRIPTION OF THE DRAWINGS

The accompany drawings, which are incorporated in and form a part of the specification illustrate embodiments of the present invention and, together with the description, serve to explain the principles of the invention. In the drawings.

DETAILED DESCRIPTION OF THE INVENTION

The present invention makes use of the concept of what may be referred to as "phonological environment" which affects characteristic phonological patterns of syllables and hence is very important in voice recognition. By analyzing the syllable "NO" appearing in spoken Japanese words and phrases, for example, it is observed that the pattern corresponding to the syllable "NO" in a phrase "NAINOWA" is more like that in the phrase "NIOINO" or "KANJINO" than that in "GARASUNO". This indicates that the syllable "NO" following a vowel "I" sounds differently from when it follows a vowel "U". In other words, deformations of voice patterns are intimately dependent on the phonological environment in which they appear. The present invention makes use of this correlation between the deformations in voice patterns and the phonological environment.

Figure 1:
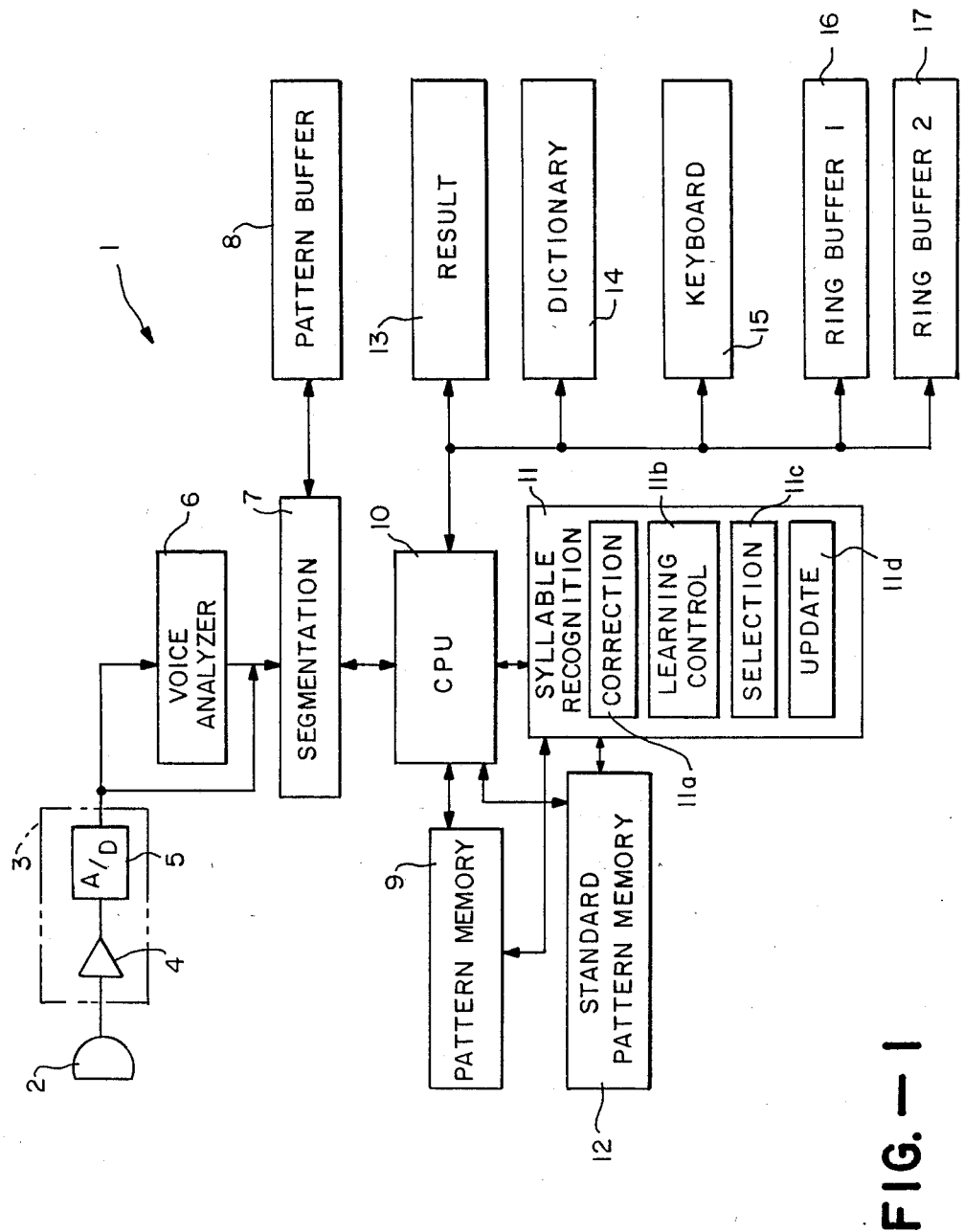
FIG. 1 is a block diagram of a Japanese language voice input device embodying the present invention.
Figure 2:
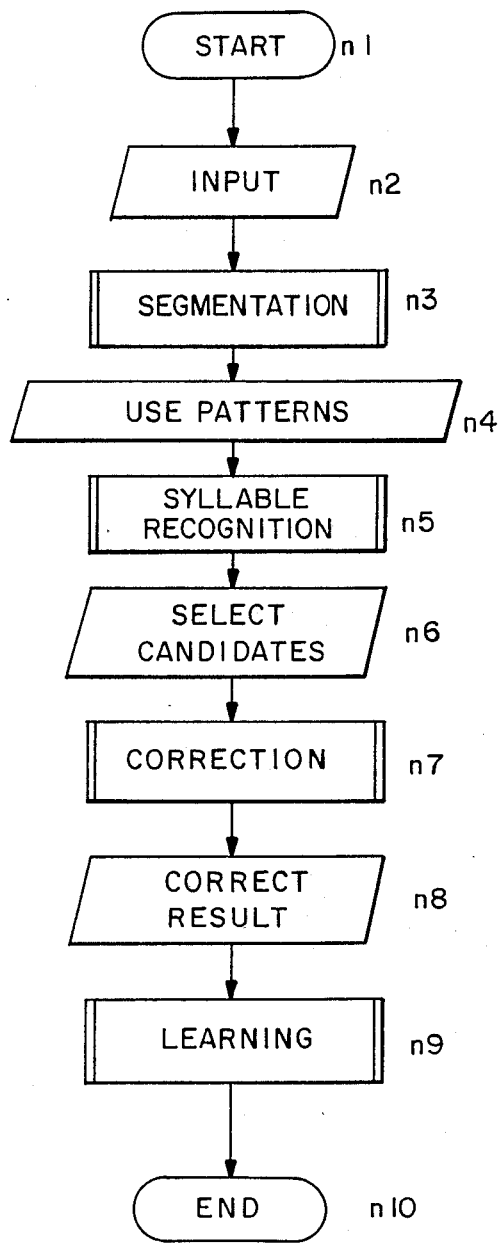
FIG. 2 is a flow chart for the operation of the device shown in FIG. 1.

FIG. 1 is a block diagram of a Japanese language voice input device capable of recognizing continuously received voice signals in units of syllables, making corrections by using a dictionary and thereafter transmitting output signals in units of recognized words, etc. With reference simultaneously to FIG. 1 and FIG. 2 which is a flow chart of the voice recognition process by the voice input device 1 of FIG. 1, an input voice signal is received through a microphone 2 by an analog input unit 3 where it is amplified by an amplifier 4 and converted into a digital signal by an analog-to-digital converter 5. The digital signal thus obtained is thereupon transmitted to a voice analyzer unit 6 and a segmentation unit 7 (n1-n2).

Thereafter (n3), the digital signal thus transmitted to the voice analyzer unit 6 is divided into frames of about 16 ms for spectral analysis and characteristic parameters necessary for the segmentation of syllables are transmitted to the segmentation unit 7 at intervals of about 8 ms. In the segmentation unit 7, various characteristic parameters transmitted from the voice analyzer unit 6 are temporarily stored in a ring-shaped pattern buffer 8 while, at the same time, syllables are separated out and the characteristics of each syllable are stored in a pattern memory 9 as patterns (n4). The pattern buffer 8 is so structured as to be able to store a plurality of syllables. Operations of the segmentation unit 7 are controlled by a central processing unit (CPU) 10.

Next, syllable recognition is attempted (n5) and candidates are selected (n6). This is done in a syllable recognition unit 11 where distances are calculated between the characteristic pattern of each syllable and all standard characteristic patterns that are already stored in a standard characteristic pattern memory 12 and candidates are selected on the basis of their similarity parameters. Thereafter, candidates having the same phonetic label are combined and the results are stored in a result memory 13.

Next, errors in syllable recognition are corrected (n7) and a correct result of syllable recognition is established (n8). Inside the syllable recognition unit 11, there is a correction section 11a which uses a word processing dictionary stored in a dictionary memory 14 and serves to automatically correct the errors in the results of syllable recognition. Alternatively, the user may be allowed to select a correct candidate from the list of candidates corresponding to an input voice signal or to directly correct an error from a keyboard input device 15. After corrections are effected, the result thus established to be correct may be outputted as a character array.

The process described above will be explained more in detail below by way of an example. Let us assume that the speaker's input voice signal corresponds to the Japanese word "KAIWA". Three segments "KA", "I" and "WA" are identified and the digital signal for each segment is compared with the standard patterns. The results of such comparisons are expressed in terms of "distances". Table 1 shows illustrative examples of calculated distances and candidates arranged in ascending orders of the calculated distances. According to this example, when the segment corresponding to the input voice signal "KA" was compared with a first pattern labeled "KA", the calculated distance was 1000. Distances were similarly calculated with a fourth pattern labeled "GA", a third pattern labeled "KA" and so forth and distances 1100, 1150, ... were obtained. Similarly, the segment corresponding to the input voice signal "I" was compared with a fifth pattern labeled "PI", second, eighth and fifth patterns labeled "I" and so forth and distances 1000, 1030, 1090, 1150, ... were obtained. After Table 1 is thus obtained, one would conclude that the spoken word was "KAPIWA" by picking the top candidates from Table 1 and thereby obtaining the smallest total distance of 1000+1000+1000. But, there is no Japanese word "KAPIWA", that is, the word "KAPIWA" is not stored in the dictionary. The combination of candidates which gives the next smallest sum, according to Table 1, is "KAIWA" which is obtained by taking the top candidate KA-1 for "KA", the second candidate I-2 for "I" and the top candidate WA-5 for "WA". The second smallest total distance in this case is 1000+1030+1000=3030. The word "KAIWA" being in the dictionary, the system reaches the conclusion which happens to be correct that the input voice signal was "KAIWA".

TABLE 1

| Order | Candidate Distance | Candidate Distance | Candidate Distance |
|---|---|---|---|
| 1 | KA-1 1000 | PI-5 1000 | WA-5 1000 |
| 2 | GA-4 1100 | I-2 1030 | WA-1 1090 |
| 3 | KA-3 1150 | I-8 1090 | BA-2 1150 |
| 4 | KA-2 1200 | I-5 1150 | WA-3 1170 |
| 5 | TA-2 1220 | RI-1 1200 | |
| 6 | KA-5 1240 | NI-4 1220 | |
| 7 | | I-3 1230 | |

After a correct result is determined (n8), there takes place what may be referred to as a learning process (n9), or the process of updating or even deleting a standard characteristic pattern by using the recent historical data on whether the characteristic patterns of each input signal have been correct or incorrect. The aforementioned learning process carried out in a learning control section 11b of the syllable recognition unit 11 will be explained below by way of the example considered above wherein the syllable "I" was tentatively recognized as "PI".

When it is decided that characteristic patterns corresponding to the input syllable "I" should be updated, a pattern selection section 11c in the syllable recognition unit 11 functions to select for updating only those of the standard characteristic patterns in the memory 12 that are in the same phonological environment as the input syllable. In this case, the vowel immediately before the syllable "I" (in the word "KAIWA") being "A", the pattern selection section 11c selects only those of the patterns corresponding to "I" in this phonological environment and, of the patterns thus selected, the one which has least contributed to pattern recognition is either replaced by the input characteristic pattern or the average between the original pattern and the input pattern.

The description of the present invention given above has been by way of only one example. The scope of this invention is not intended to be limited by this example. Although the sound immediately before the syllable under investigation was considered in the above example to limit the number of patterns to be compared, chronological environment may be established by considering both the sounds before and after the syllable. The method described above of this invention is particularly effective if the environment is divided into many classes when there are a large number (several tens) of standard characteristic patterns.

In another aspect of the present invention, there is provided a first ring buffer 16 for storing the time sequence of correct and incorrect recognitions of input signals for individual syllables and a second ring buffer 17 for storing the time sequence of correct and incorrect recognitions for all syllables. These ring buffers 16 and 17 each have evenly partitioned memory elements connected in a ring-like formation in the temporal sequence, each memory element storing a result of recognition. In order to calculate the recognation ratio R(n) corresponding to the most recent n recognitions of syllables of all types, the second ring buffer 17 is comprised of n memory elements so that it can store a temporal sequence of n successive results of past recognitions and these stored results are updated every time a new result of syllable recognition is received. The aforementioned recognition ratio $R(n)$ is defined by $n_e/n$ where $n_e$ is the number of erroneous recognitions out of the past n recognitions the result of which are stored in the n memory cells of the second ring buffer 17.

Similarly, error ratios $r_i(m)$ for the syllable identified by the subscript i derived from the m most recent recognitions of this syllable is defined by $m_e/m$ where $m_e$ is the number of erroneous recognitions out of the total of m most recent recognitions of the syllable i. Error ratios $r_i(m)$ of individual syllables are calculated from the contents of the first ring buffer 16 which is similarly structured. Determination whether an input syllable should be "learned" is made in the learning control section 11b as follows according to these ratios $R(n)$ and $r_i(m)$. For example, let us assume $n=128$ and $m=3$ for all syllables. The condition for learning may be given in three stages according to an embodiment of the present invention. The first stage (S1) relates to situations where $R(128)$ is less than 80%. In this stage, if $r_i(3)$ is equal to or greater than $\frac{1}{3}$, the condition for learning is considered satisfied. In other words, if there has been one error or more in recognizing the syllable i within the last three times of recognizing this syllable, the corresponding pattern is "learned". The second stage (S2) relates to situations where $R(128)$ is equal to or greater than 80% and less than 85%. In this stage, the condition for learning is considered satisfied if $r_i(2)$ is equal to or greater than $\frac{1}{2}$, that is, if at least one of the two most recent recognitions of the syllable i was erroneous. Similarly, the third stage (S3) relates to situations where $R(128)$ is equal to or greater than 85%. In this stage, the condition for learning is considered satisfied if $r_i(1)$ is equal to one, that is, if the most recent recognition of the syllable i was erroneous. With the condition thus determined, the update section 11d of the syllable recognition unit 11 retrieves the worst (with the lowest recognition ratio) among the standard characteristic patterns in the memory 12 and updates it either by replacing it by the characteristic pattern of that syllable or by using it in an averaging process described above.

Figure 3:
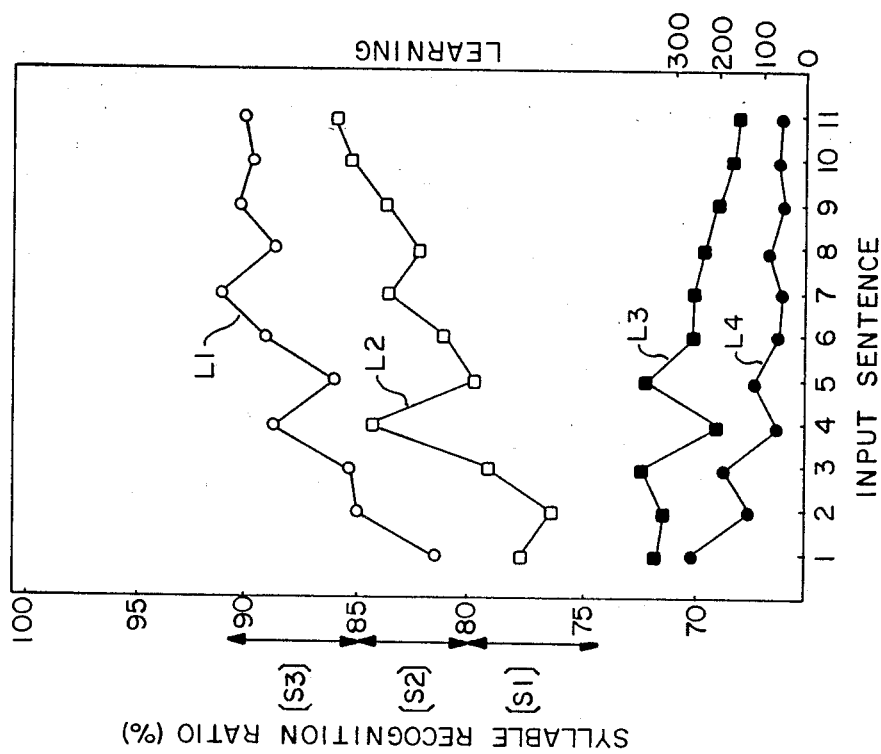
FIG. 3 is a graph showing the effects of learning by the device of FIG. 1.

Effects of a learning process is illustrated by way of an example in FIG. 3. For this example, eleven sentences with 650 syllables in each on the average were read by two different speakers and used as input signal. For each sentence, changes in the average recognition ratio of syllables as the sentences were read sequentially and the number of input signals which were learned are shown. The lines L1 and L2 represent the syllable recognition ratios when the sentences were read by the first and second speaker, respectively. The lines L3 and L4 represent the frequencies of pattern learning when the sentences were read by the second and the first speaker, respectively. FIG. 3 shows that the number of learned syllables is greater in the case of the second speaker with lower recognition ratio. As the number of processed sentences increases, the average recognition ratio also increases and the number of learned syllables increases, showing the effects of learning. The particular example in FIG. 3 shows that the average recognition ratio was particularly high but learning was reduced with the fourth sentence while the average recognition ratio was low but learning was accelerated with the fifth sentence. This seems to indicate that a high level of recognition ratio is maintained by controlling learning.

Figure 4:
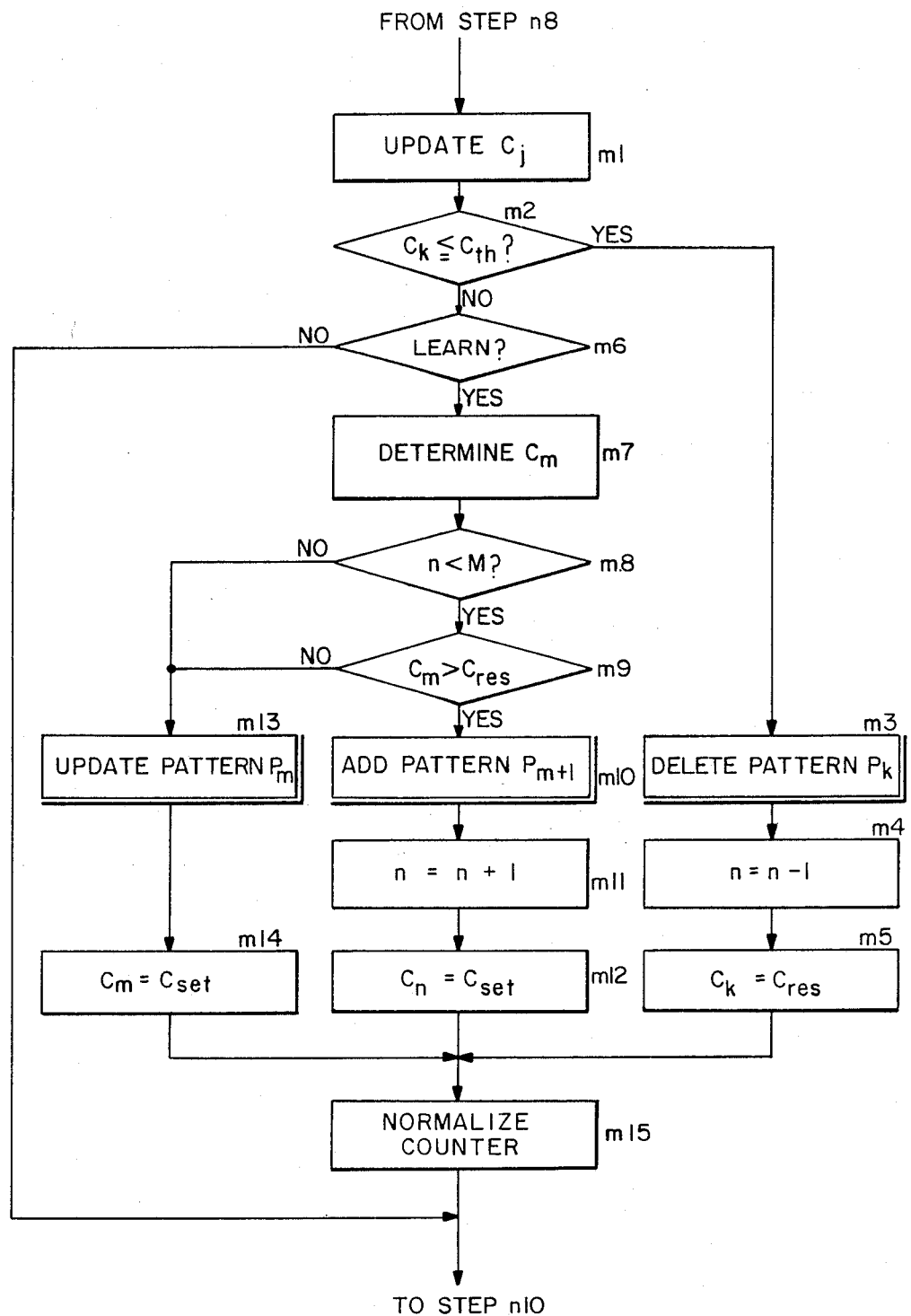
FIG. 4 is a flow chart of a learning process embodying the present invention.

Step n9 of FIG. 2 is explained below more in detail by way of FIG. 4. The system is provided with counters (not shown in FIG. 1) for storing the information regarding how each standard characteristic pattern has contributed to pattern recognition. In the beginning, the counters corresponding to standard patterns which have not been introduced are reset to a predefined initial value $C_{res}$. Thereafter, syllables established as correct in Step n8 of FIG. 2 are sequentially received and the aforementioned counters are updated (m1). Updating a counter means to change its content, depending on whether the corresponding pattern became the first candidate, the second candidate and so on, and well as whether the recognition by that pattern was correct or erroneous. For example, if recognition was correct, 4, 2 and 1 may be added to the value in the counter, corresponding to the first, second and third candidate, respectfully, while 4, 2 and 1 may be subtracted if recognition was erroneous, corresponding to the first, second and third candidate, respectively.

The system may be so designed as to allow patterns with extremely poor contribution records to be dropped. In this case, a low threshold value $C_{th}$ is typically predetermined and the counter value $C_k$ is compared with this threshold value $C_{th}$ (m2), the corresponding pattern $P_k$ being deleted (m3) if $C_k$ is not greater than $C_{th}$ (YES in m2). If a pattern is thus deleted, the current total number of standard characteristic patterns n is decreased by one (m4) and the corresponding count $C_k$ is reset to the aforementioned reset value $C_{res}$ (m5). If $C_k$ is lower than the threshold value $C_{th}$ (NO in m2), the contents of the buffers 16 and 17 are consulted to determine whether any of the input syllables should be learned. If it is determined that an input signal $S_{in}$ is to be learned (YES in m6), standard characteristic patterns corresponding to the same syllable label as that of the input syllable $S_{in}$ are considered and the one $P_m$ among them having the smallest counter value $C_m$ (that is, the pattern which has contributed least in recognition processes) is identified (m7). If n is smaller than a predetermined maximum value M (YES in m8) and $C_m$ is greater than $C_{res}$ (YES in m9), the input characteristic pattern $P_{in}$ (corresponding to the syllable $S_{in}$) is added as the (n+1)st standard characteristic pattern $P_{n+1}$ (m10). The total number of standard characteristic patterns n is accordingly increased by one (m11) and the counter corresponding to this newly added pattern is set to a predetermined value $C_{set}$ (m12). If n=M (NO in m8) or $C_m$ is not greater than $C_{res}$ (NO in m9), the least contributing pattern $P_m$ is updated (m13) and the corresponding counter value is set to the aforementioned value $C_{set}$ (m14). Before the system ends the routine, the counter values $C_i$ are normalized to $C_i' = C_i + (-C_i/L - C_{cen})$ where L indicates the number of standard characteristic patterns belonging to the same syllable label and $C_{cen}$ indicates the center value of the counter variables (m15).

Figure 5:
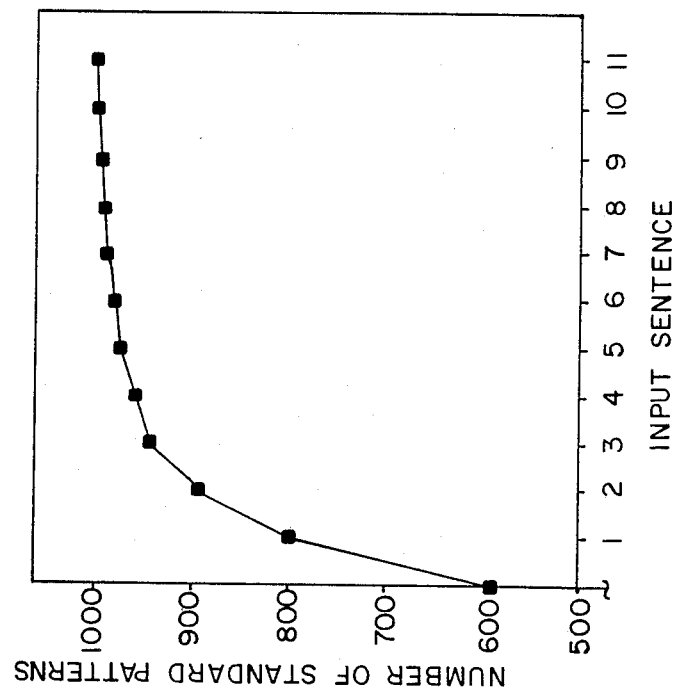
FIG. 5 is another graph showing the effects of learning by the device of FIG. 1.

In summary, the procedure described above is characterized in part by the step of defining a maximum number of standard characteristic patterns for each syllable and registering initially a minimum number of them necessary for recognition. Thereafter, input patterns are automatically added as new standard characteristic patterns until the aforementioned maximum number is reached. With a conventional system which does not set a maximum pattern number for each syllable, by contrast, the number of standard characteristic patterns for a syllable tends to increase or decrease and to become much greater or much smaller than the maximum value which would be set by the present invention. According to the present invention, patterns which least contribute to correct recognition of an input signal are selectively updated or deleted and new patterns are added within a predetermined limit such that an optimum set of standard characteristic patterns can be obtained. FIG. 5 shows how the number of standard characteristic patterns changes in the example described above by the lines L2 and L3 in FIG. 3. In this example, 590 syllable patterns were registered initially as standard characteristic patterns and the maximum number M was set to 1020. No provision for deletion was made in this example and FIG. 5 clearly shows how quickly the number of patterns approaches the maximum number as the number of sentences which have been read increases. With reference simultaneously to the line L3 in FIG. 3, it is observed that patterns were learned about 300 times by the second sentence while the number of patterns increased by about 100 (from 800 to 900 as shown in FIG. 5), thus contributing to the improvement of average recognition ratio.

The foregoing description of the present invention has been presented for purposes of illustration and description. It is not intended to be exhaustive or to limit the invention to the precise form disclosed, and many modifications and variations are possible in light of the above teaching. For example, the system is equally applicable to many languages other than Japanese. Such modifications and variations that may be apparent to a person skilled in the art are intended to be included within the scope of this invention.

What is claimed is:

1. A voice recognition method comprising the steps of
    extracting patterns from an input voice signal,
    tentatively identifying each of said extracted patterns as representing a syllable by calculating similarity levels of said each extracted pattern with a plurality of standard patterns each of which is currently registered in a memory means, said memory means also storing phonological information on an environment associated with each of said currently registered standard patterns,
    determining which of said extracted patterns were incorrectly identified in said tentatively identifying step,
    assigning a new syllable to each of said patterns which were determined as having been incorrectly identified in said determining step, and
    updating said memory means by storing in said memory means a pattern associated with said new syllable together with phonological information on an environment associated with said pattern associated with said new syllable.

2. A voice recognition method comprising the steps of
    extracting patterns from an input voice signal,
    tentatively identifying each of said extracted patterns as representing a syllable by calculating similarity levels of said each extracted pattern with a plurality of standard patterns each of which is currently registered in a memory means, said memory means also storing phonological information on an environment associated with each of said currently registered standard patterns,
    determining which of said extracted patterns were correctly and incorrectly identified in said tentatively identifying step,
    assigning a new syllable to each of said patterns which were determined as having been incorrectly identified in said determining step,
    storing in a first buffer temporal sequences each associated with a syllable and showing the order in which patterns are determined in said determining step to have been correctly and incorrectly identified in said tentatively identifying step as representing said syllable,
    storing in a second buffer the temporal sequence in which all of said extracted patterns have been determined in said determining step as having been correctly and incorrectly identified in said tentatively identifying step,
    referencing the contents of said first and second buffers, when a new voice signal with new patterns is received, to obtain therefrom a recent recognition record of each syllable backward in time from when said new voice signal is received, and
    determining according to said recognition record whether or not one or more of said standard patterns is to be updated by one or more of said new patterns.

3. A voice recognition method comprising the steps of
    (a) setting a maximum number allowable for standard patterns associated with each of specified syllables,
    (b) initially registering in a memory means a minimum number of standard patterns required for pattern recognition,
    (c) extracting patterns from an input voice signal,
    (d) tentatively identifying each of said extracted patterns as representing a syllable by calculating similarity levels of said each extracted pattern with a plurality of standard patterns each of which is currently registered in said memory means,
    (e) determining which of said extracted patterns were incorrectly identified in said tentatively identifying step,
    (f) assigning a new syllable to each of said patterns which were determined as having been incorrectly identified in said determining step, and
    (g) thereafter automatically updating said standard patterns in said memory means, whenever a new voice signal is inputted, by repeating steps (c)-(f) to obtain new patterns and selectively registering said new patterns in said memory means within the limit of not exceeding said maximum number.

4. A voice recognition apparatus for receiving an input voice signal and outputting a syllable array corresponding thereto, said apparatus comprising
    memory means for storing standard patterns associated with syllables together with phonological environmental information,
    analyzing means for extracting patterns from an input voice signal and tentatively identifying each of said extracted patterns as representing a syllable by calculating similarity levels of said each extracted pattern with a plurality of standard patterns currently stored in said memory means,
    a control unit,
    input means for causing said control unit to assign a selected new syllable to each pattern determined to have been incorrectly identified by said analyzing means, and a voice recognition means which serves under the control of said control unit to associate each of said standard patterns with phonological information on at least one neighborhood immediately before or after in a voice signal from which said each standard pattern was derived, and to update said memory means by registering therein said extracted patterns for which a new syllable has been assigned by said input means, each of said extracted patterns replacing one of said standard patterns having the same phonological information on a neighborhood thereof as do said extracted patterns.

5. A voice recognition apparatus for receiving an input voice signal and outputting a syllable array corresponding thereto, said apparatus comprising memory means for storing standard patterns associated with syllables together with phonological environmental information, analyzing means for extracting patterns from an input voice signal and tentatively identifying each of said extracted patterns as representing a syllable by calculating similarity levels of said each extracted pattern with a plurality of standard patterns currently stored in said memory means, input means for assigning a selected new syllable to each pattern determined to have been incorrectly identified by said analyzing means, the remaining ones of said extracted patterns being considered as correctly identified patterns, a first buffer storing temporal sequences, each corresponding to a syllable and showing the order in which said correctly and incorrectly identified patterns associated with said corresponding syllable have been identified, a second buffer storing the temporal sequence in which all of said correctly and incorrectly identified patterns have been identified, and a control unit which serves to reference the contents of said first and second buffers, when a new voice signal with new patterns is received, to obtain therefrom a recent recognition record of each syllable backward in time from when said new voice signal is received and to determine according to said recognition record whether or not one or more of said standard patterns is to be updated by one or more of said new patterns.

6. A voice recognition apparatus for receiving an input voice signal and outputting a syllable array corresponding thereto, said apparatus comprising memory means for storing standard patterns associated with syllables, analyzing means for extracting patterns from an input voice signal and tentatively identifying each of said extracted patterns as representing a syllable by calculating similarity levels of said each extracted pattern with a plurality of standard patterns currently stored in said memory means, input means for assigning a selected new syllable to each pattern determined to have been incorrectly identified by said analyzing means, the remaining ones of said extracted patterns being considered as correctly identified patterns, and control means programmed to set a maximum number allowable for standard patterns associated with each of specified syllables, to initially register in said memory means a minimum number of standard patterns required for pattern recognition, and to thereafter automatically update the contents of said memory means, whenever a new voice signal is inputted, by registering in said memory means new patterns extracted from said inputted voice signal within the limit of not exceeding said maximum number.

* * * * *